(12) United States Patent
Piersol et al.

(10) Patent No.: US 7,386,599 B1
(45) Date of Patent: Jun. 10, 2008

(54) METHODS AND APPARATUSES FOR SEARCHING BOTH EXTERNAL PUBLIC DOCUMENTS AND INTERNAL PRIVATE DOCUMENTS IN RESPONSE TO SINGLE SEARCH REQUEST

(75) Inventors: Kurt W. Piersol, Santa Cruz, CA (US); Jamey Graham, Palo Alto, CA (US)

(73) Assignee: Ricoh Co., Ltd., Tokyo (JP)

( * ) Notice: Subject to any disclaimer, the term of this patent is extended or adjusted under 35 U.S.C. 154(b) by 0 days.

(21) Appl. No.: 09/410,494

(22) Filed: Sep. 30, 1999

(51) Int. Cl.
*G06F 15/16* (2006.01)

(52) U.S. Cl. ............... 709/217; 709/203; 709/212; 709/245; 707/3; 707/7; 707/10

(58) Field of Classification Search ........... 709/202, 709/213, 217, 218, 219, 212, 203, 245; 707/3, 707/7, 10
See application file for complete search history.

(56) References Cited

U.S. PATENT DOCUMENTS

| | | | |
|---|---|---|---|
| 5,222,234 A | 6/1993 | Wang et al. | |
| 5,572,583 A | 11/1996 | Wheeler, Jr. et al. | |
| 5,708,810 A | 1/1998 | Kern et al. | |
| 5,742,816 A | 4/1998 | Barr et al. | |
| 5,749,083 A | 5/1998 | Koda et al. | |
| 5,793,498 A | 8/1998 | Scholl et al. | |
| 5,826,261 A * | 10/1998 | Spencer | 707/5 |
| 5,845,278 A * | 12/1998 | Kirsch et al. | 707/3 |
| 5,845,304 A | 12/1998 | Iijima | |
| 5,848,410 A * | 12/1998 | Walls et al. | 707/4 |
| 5,861,959 A | 1/1999 | Barak | |
| 5,880,855 A | 3/1999 | Ishikawa | |
| 5,905,980 A | 5/1999 | Masuichi et al. | |
| 5,907,837 A | 5/1999 | Ferrel et al. | |
| 5,913,040 A * | 6/1999 | Rakavy et al. | |
| 5,920,854 A * | 7/1999 | Kirsch et al. | 707/3 |
| 5,923,845 A | 7/1999 | Kamiya et al. | |
| 5,924,090 A * | 7/1999 | Krellenstein | |
| 5,946,701 A | 8/1999 | Hamada | |
| 5,983,216 A * | 11/1999 | Kirsch et al. | 707/2 |
| 5,995,956 A * | 11/1999 | Nguyen | |
| 6,006,217 A * | 12/1999 | Lumsden | |

(Continued)

OTHER PUBLICATIONS

Derwent ACC-No. 1999-274427, Information Process Apparatus Information with Information Search Function . . . , Priority—Sep. 1997, Copyright 1999 Derwent Information Ltd, Japanese Patent.*

*Primary Examiner*—Michael Won
(74) *Attorney, Agent, or Firm*—Blakely, Sokoloff, Taylor & Zafman LLP (57) ABSTRACT

Methods and apparatuses for both public documents and private documents in response to a single search request are disclosed. Public documents are electronic documents that are made available to large groups of people in by the publisher of the document. An example of a public document is a World Wide Web page. Private documents are documents that have restricted access. An example of a private document is a document that generated by members of an organization and is available only to members of the organization. As described in greater detail below, a portal appliance or other device can be used to search both public and authorized private electronic documents in response to a single search request thereby improving the results of the search and/or reducing the number of searches required to find the desired material.

30 Claims, 7 Drawing Sheets

U.S. PATENT DOCUMENTS

| | | | |
|---|---|---|---|
| 6,014,681 A * | 1/2000 | Walker et al. ............... 715/530 |
| 6,055,538 A * | 4/2000 | Kessenich et al. |
| 6,078,917 A * | 6/2000 | Paulsen, Jr. et al. |
| 6,088,675 A * | 7/2000 | MacKenty et al. |
| 6,100,890 A * | 8/2000 | Bates et al. ................. 715/826 |
| 6,195,725 B1 * | 2/2001 | Luhmann .................... 710/266 |
| 6,263,332 B1 * | 7/2001 | Nasr et al. ..................... 707/5 |
| 6,363,377 B1 * | 3/2002 | Kravets et al. ................ 707/4 |
| 6,370,527 B1 * | 4/2002 | Singhal ......................... 707/6 |
| 6,442,589 B1 * | 8/2002 | Takahashi et al. .......... 709/203 |
| 6,456,305 B1 * | 9/2002 | Qureshi et al. ............. 715/800 |
| 6,476,827 B1 * | 11/2002 | Porter ........................ 715/738 |
| 6,484,162 B1 * | 11/2002 | Edlund et al. ................. 707/3 |
| 6,591,261 B1 * | 7/2003 | Arthurs ......................... 707/2 |
| 6,601,061 B1 * | 7/2003 | Holt et al. ..................... 707/3 |
| 6,804,674 B2 * | 10/2004 | Hsiao et al. .................. 707/10 |
| 6,832,221 B2 * | 12/2004 | Takahashi ...................... 707/6 |

* cited by examiner

METHODS AND APPARATUSES FOR SEARCHING BOTH EXTERNAL PUBLIC DOCUMENTS AND INTERNAL PRIVATE DOCUMENTS IN RESPONSE TO SINGLE SEARCH REQUEST

FIELD OF THE INVENTION

The invention relates to data processing. More specifically, the invention relates to searching and/or retrieval of public external documents and private internal documents that have been unconsciously captured in response to a single search request.

BACKGROUND OF THE INVENTION

Internet portals (or gateways) are specialized World Wide Web sites that provide a starting site for users accessing the Web. Typically, these portals provide globally useful content and searching capabilities. Portals primarily provide value by helping users find and use Web content.

Typical services offered by portal sites include a directory of Web sites, a facility to search for other sites, news, weather information, e-mail, stock quotes, phone and map information, etc. However, portals only provide the ability to search documents that have been made public by the publishers of the documents. Many documents are not available to these portals.

Many organizations have a document management policy for managing and maintaining internal private documents. Because these documents are intended to be private, they are not available to the public for searching via portals. Thus, if a searching party wishes to search both public and private documents, at least two search requests are required and at least two search results must be evaluated. Generating multiple search requests and evaluation of multiple search results can be time consuming and inefficient. Therefore, what is needed is an improved scheme for searching public and private documents.

SUMMARY OF THE INVENTION

Methods and apparatuses for searching both external public documents and internal private documents in response to a single search request is described. A first search request is generated automatically with an electronic device in response to an original search request. The first search request to cause a search to be performed on electronic documents unconsciously captured by a local network device. The search of the electronic documents unconsciously captured is performed according to search parameters of the original search request. A second search request is generated automatically with the electronic device in response to the original search request. The second search request causes a search to be performed on electronic documents available via a network portal of an external network according to the search parameters of the original search request.

BRIEF DESCRIPTION OF THE DRAWINGS

The invention is illustrated by way of example, and not by way of limitation in the figures of the accompanying drawings in which like reference numerals refer to similar elements.

DETAILED DESCRIPTION

Methods and apparatuses for searching both external public documents and internal private documents in response to a single search request is described. In the following description, for purposes of explanation, numerous specific details are set forth in order to provide a thorough understanding of the invention. It will be apparent, however, to one skilled in the art that the invention can be practiced without these specific details. In other instances, structures and devices are shown in block diagram form in order to avoid obscuring the invention.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

Methods and apparatuses for both public documents and private documents in response to a single search request are disclosed. Public documents are electronic documents that are made available to large groups of people in by the publisher of the document. An example of a public document is a World Wide Web page. Private documents are documents that have restricted access. An example of a private document is a document that generated by members of an organization and is available only to members of the organization. As described in greater detail below, a portal appliance or other device can be used to search both public and authorized private electronic documents in response to a single search request thereby improving the results of the search and/or reducing the number of searches required to find the desired material.

System Overview

Figure 1:
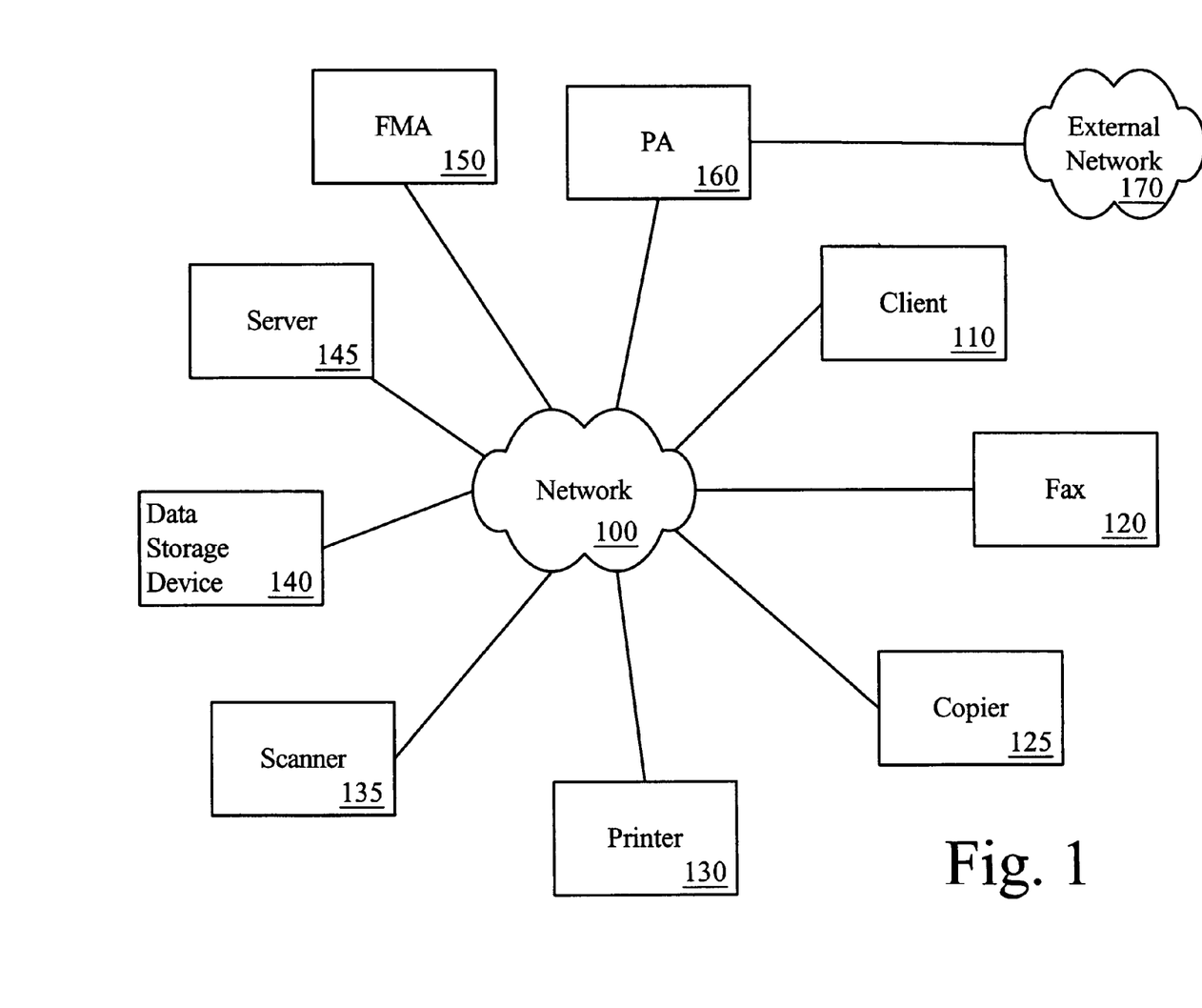
FIG. 1 illustrates one embodiment of a file management system.

FIG. 1 illustrates one embodiment of a file management system. Client 110 represents a general purpose digital computer coupled to network 100. Network 100 may represent a local area network (LAN), an intranet, the Internet, or any other interconnected data path across which multiple devices may communicate. Also connected to network 100 is facsimile machine 120, copier 125, printer 130, scanner 135, data storage device 140, server 145, file management appliance ("FMA") 150, and portal appliance ("PA") 160.

Facsimile machine 120 is connected to network 100 and represents a device capable of transmitting and receiving data such as text and images over a telephone or other communications line ("faxing"). In one embodiment, facsimile machine 120 may transmit text and images originating in printed form, or in another embodiment, facsimile machine 120 may transmit electronic data originating from any number of devices connected to network 100. Similarly, in one embodiment, facsimile machine 120 may print a hard copy of the received data, or in another embodiment, facsimile machine 120 may forward the received data to any number of devices connected to network 100.

Copier 125 represents a device capable of reproducing text and images. In one embodiment, copier 125 is a photocopier that reproduces printed text and images, whereas in another embodiment copier 125 is a photocopier that reproduces data received from any number of devices connected to network 100.

Printer 130 represents a device capable of converting electronic data into printed text and images, whereas scanner 135 represents a device capable of converting printed text and images into electronic data. In one embodiment, facsimile machine 120, photocopier 125, printer 130, and scanner 135 are each separate and distinct devices connected to network 100. In another embodiment, a multifunction device may replace any combination of these devices. Any number of devices may be omitted from or added to network 100 without parting from the spirit and scope of the present invention.

In one embodiment, data storage device 140 is also coupled to network 100. In one embodiment, data storage device 140 represents a removable storage medium such as a CD-ROM, DVD-ROM, DVD-RAM, DVD-RW, magnetic tape or other storage medium. In an alternative embodiment, data storage device 140 represents a non-removable storage medium such as a hard or fixed disk drive. In one embodiment, data storage device 140 is an archiving device.

Server 145 represents a general purpose digital computer connected to network 100 and is configured to provide network services to other devices connected to network 100. In one embodiment, server 145 provides file sharing and printer services to network 100. In another embodiment, server 145 is a Web server that provides requested hypertext markup language (HTML) pages or files over network 100 to requesting devices. In yet another embodiment, server 145 is a server capable of providing configuration services to network 100.

FMA 150 is a file management appliance that is connected to network 100. In one embodiment, FMA 150 provides document capture and indexing services. In one embodiment, FMA 150 is a device capable of providing configuration services in addition to document capture and indexing services to network 100. In one embodiment, FMA 150 is not directly connected to any device, but rather is communicatively coupled to other devices through network 100. FMA 150 is capable of publishing its presence to other devices on network 100 using the HTTP or other protocols.

Automatic document capture (or "unconscious capture"), which is discussed more fully below, is the process by which one device, requests an archiving device, such as data storage device 140, to archive a document. In one embodiment, FMA 150 is the requesting device; however, other devices can also request archival of documents. Greater detail with respect to capture of documents that are copied, faxed, printed and other documents as well as document management are disclosed in U.S. Pat. No. 5,978,477 entitled "AUTOMATIC AND TRANSPARENT DOCUMENT ARCHIVING" filed Nov. 21, 1996, and U.S. Pat. No. 5,893,908, entitled "DOCUMENT MANAGEMENT SYSTEM" filed Nov. 21, 1996, both of which are incorporated by reference and assigned to the corporate assignee of the present U.S. patent application.

A document may be composed of many distinct files of varying types, each representing at least the partial content of the document. A print job created on client 110 and intended for printer 130 could be captured, for example, as a thumbnail image, a postscript file, a portable document format (PDF) file, and an ASCII file containing extracted text. Additionally, FMA 150 is able to process multiple image file formats including the joint photographic experts group format (JPEG), graphics interchange format (GIF), and tagged image file format (TIFF) to name just a few. In one embodiment, each unique file type is represented by a corresponding unique file extension appended to the file's name. For example, a portable document format file may be represented as: filename.pdf, whereas a thumbnail image may be represented as: filename.thumb.

In one embodiment, FMA 150 is able to interpret compound filename extensions. For example, a thumbnail image file that contains images in a tagged image file format may be represented as filename.thumb.tiff. In one embodiment, FMA 150 uses the page number of the document as the filename. In such a manner, a document may be represented by multiple files located in the same directory, each representing a different page of the document as reflected by the filename. For example, "01.thumb.jpg" would represent a thumbnail image of page one in joint photographic experts group format. Similarly, "12.thumb.tiff" would represent a thumbnail image of page twelve in tagged image file format.

FMA 150 may index data captured from various devices connected to network 100 including printer 130, facsimile machine 120, client 110 and scanner 135. In one embodiment, facsimile machine 120 captures data over a telephone line and subsequently sends at least part of the received data to FMA 150 over network 100. In another embodiment, data sent from client 110 to facsimile machine 120 over network 100 is transparently (unbeknownst to the device) captured and at least part of the data is routed to FMA 150 for indexing.

In an alternative embodiment, facsimile machine 120 is located internal to client 110 thereby eliminating the need for client 110 to send data over network 100. In such an embodiment, FMA 150 nonetheless receives at least part of the captured data. In one embodiment, FMA 150 receives bibliographic-type data extracted from the document. In one embodiment, data received from facsimile machine 120 is composed in TIFF format, whereas data received from client 110 may retain its original format upon transfer.

The FMA capture process similarly applies to other devices connected to network 100 such as scanner 135 and copier 125. In one embodiment, if optical character recognition ("OCR") is performed on a scanned or copied document, FMA 150 creates two special OCR-related files. In one embodiment, "contents.txt" and "contents.pdf" are created and used by FMA 150 to index the full text of the document and return page images as a document file respectively.

In one embodiment, FMA 150 is capable of providing the same functionality as any one or more of the devices on network 100, thereby eliminating the need for these additional specialized devices. In one embodiment, however, FMA 150 is implemented as a thin server containing enough hardware and software to support document capture and indexing over network 100.

PA 160 is also coupled to network 100. In one embodiment, PA 160 supports searches of captured internally available, or private, documents stored, for example, on data storage device 140 as well as externally available, or public, documents available from network 170. In an alternative embodiment, the functionality of PA 160 is incorporated into FMA 150 or another device (e.g., client 110, server 145) coupled to network 100. In one embodiment network 170 is the Internet; however, network 170 can be any network of electronic devices.

In one embodiment, PA 160 operates with one or more Internet portals (e.g., yahoo.com, excite.com, go.com) to provide searching capability of external documents. Any Internet portal or any portal to an external network (e.g., a portal to a second network controlled by the organization that controls network 100) can also be used by PA 160 to provide searches of external documents. In one embodiment, the portal controls the content presented to the searching party by providing "gaps" in the search report that can be "filled" by PA 160 to present a unified search result to the searching party. In an alternative embodiment, PA 160 controls the content presented by the searching party by generating search requests to one or more portals as well as a search of data storage device 140 to search private documents. PA 160 compiles the search results and presents the results to the searching party.

Unconscious Capture

Unconscious capture is an operation in which a device (e.g., FMA 150) requests an archiving device (e.g., data storage device 140) to archive a document. In general, unconscious capture refers to FMA 150, or other device, automatically capturing documents processed by network 100 or devices coupled to network 100 without user intervention. In one embodiment, a user can optionally prevent capture of one or more documents or modify which documents are automatically captured. This may be performed by operating a selection unit or device (e.g., pressing a button).

Unconscious capture can be performed by any network entity or device. In one embodiment, unconscious capture utilizes standard Internet protocols and allows the capture of multiple files associated with a single document. In another embodiment, simultaneous capture of multiple documents is supported.

In one embodiment, a document is represented by a directory containing one metadata file and at least one data file. The actual name of the document directory is not important during unconscious capture as the name of the document is not stored as part of the directory system, but is instead stored within the metadata file. In one embodiment, the name of the document is stored in the metadata file using a document serial number. In one embodiment, the capture date is used for the name of the document directory.

In one embodiment, the capture protocol is an implementation of the Internet File Transfer Protocol (FTP). In one embodiment, documents are captured either as multipurpose Internet mail extension (MIME) files in the default FTP directory, or as subdirectories of the default directory. Other capture formats can also be used.

Figure 2A:
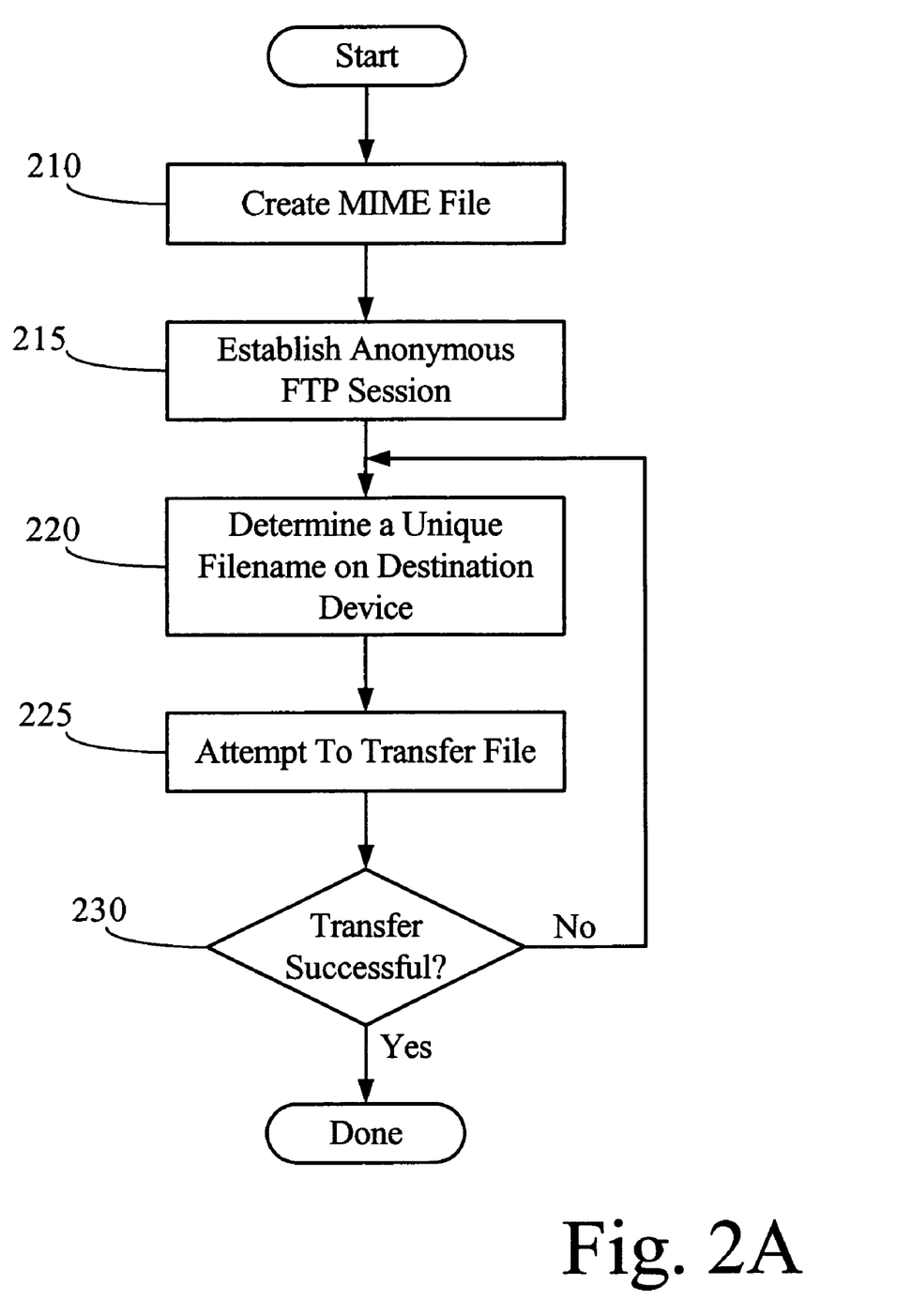
FIG. 2A illustrates one embodiment of unconscious capture using the MIME format.

FIG. 2A illustrates one embodiment of unconscious capture using the MIME format. A capturing device creates a MIME multi-part file, including all content files and a metadata file, 210. The capturing device then attempts to establish an anonymous FTP session with the destination device, 215. Once an FTP session is established, the capturing device determines a filename that is a unique on the destination device, 220 and attempts to transfer the file to the destination device, 225. If the transfer fails, the capturing device obtains a new filename and attempts the file transfer again. The capture is complete upon a successful file transfer, 230.

Figure 2B:
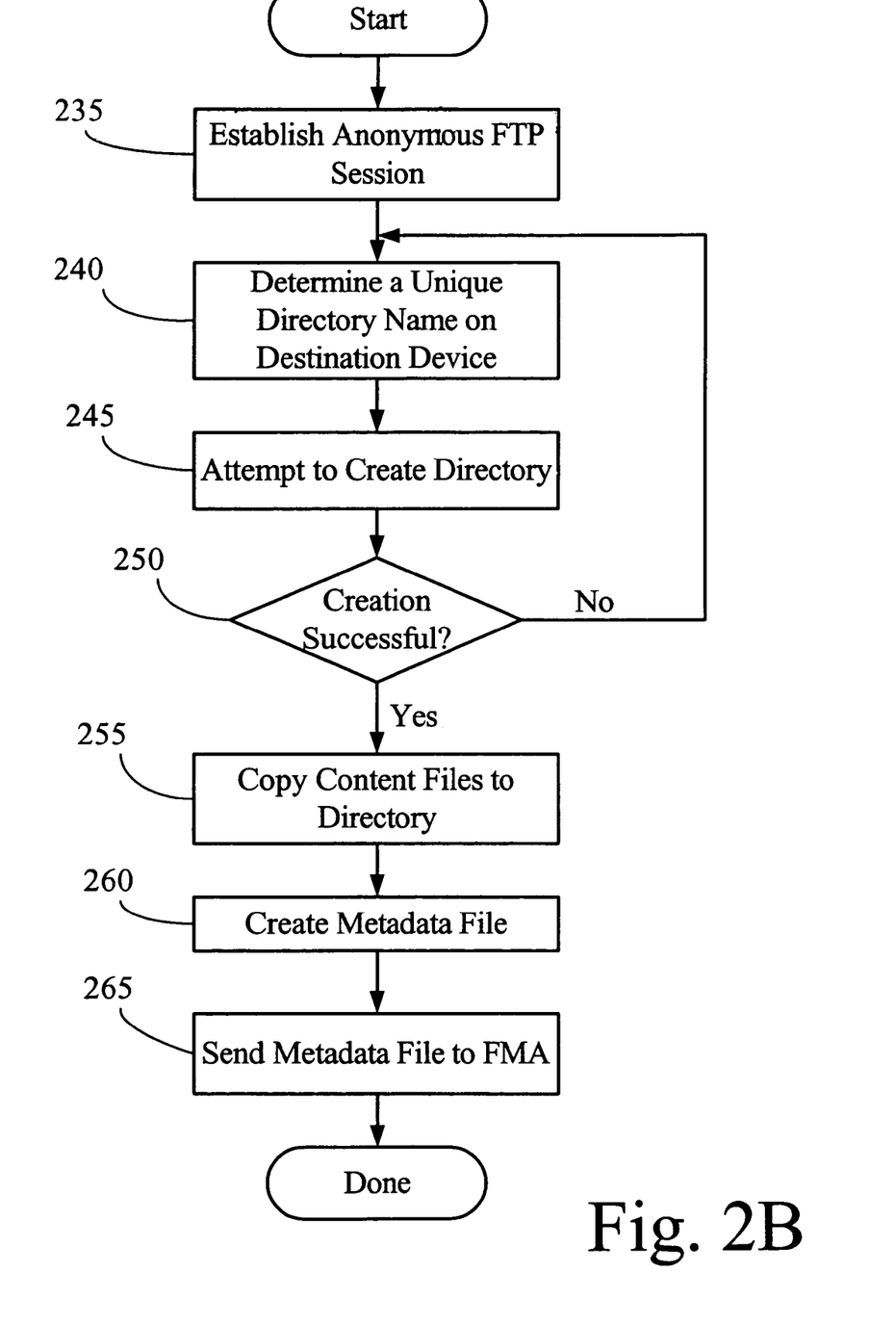
FIG. 2B illustrates one embodiment of unconscious capture in an FMA environment.

FIG. 2B illustrates one embodiment of unconscious capture in an FMA environment. The capturing device establishes an anonymous FTP session with the destination device, 235. Once the FTP session is established, the capturing device determines what it assumes to be a unique directory name on the destination device, 240. Once a directory name is determined, the capturing device attempts to create a directory with that name on the destination device, 245. If the attempt to create the directory is unsuccessful, whether due to a duplicate directory name or otherwise, the capturing device determines another directory name and attempts to create the directory again.

If, however, the capturing device successfully creates the directory on the destination device, 250, the capturing device then copies the content file or files to the newly created directory, 255. The capturing device also creates a metadata file, 260, which is then sent to the FMA device, 265 to complete the process.

Figure 2C:
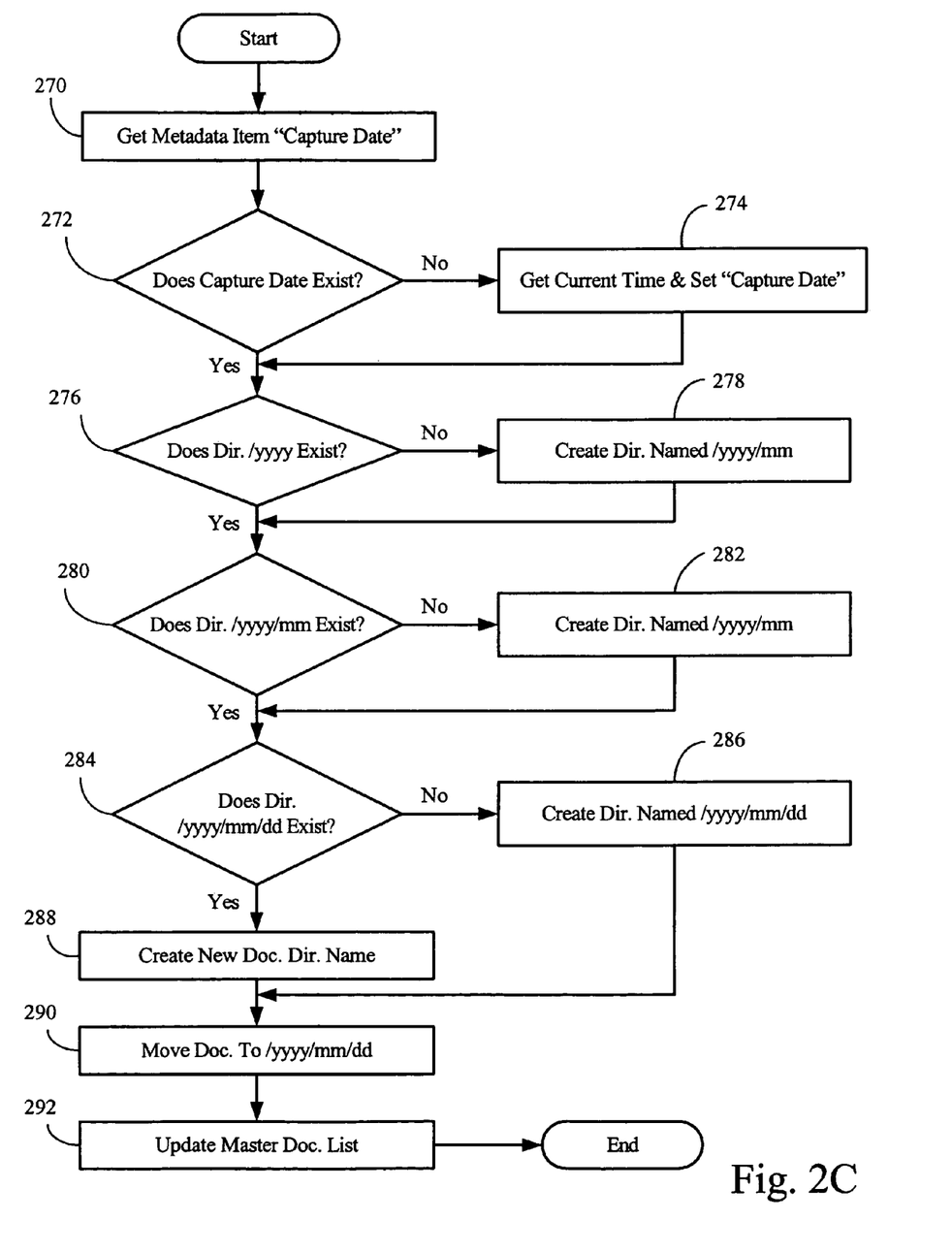
FIG. 2C illustrates one embodiment of the document storage process in a FMA environment.

FIG. 2C illustrates one embodiment of the document storage process in a FMA environment. In one embodiment, the document directory is represented by "yyyy/mm/dd" where yyyy represents the year in which the document was created, mm represents the ordinal month in which the document was created, and dd represents the day of the month in which the document was created. Other date formats and/or storage ordering can also be used.

During the document storage process, the FMA creates appropriate directories, moves the document to the appropriate directory and updates the master list. The metadata file of the document to be stored is accessed and information from its "Capture data" field is retrieved, 270. If the document's "Capture date" or even the metadata file does not exist, 272, then the current system time is obtained and used as the document's "Capture date," 274. If, however, the document's "Capture date" does exist, 272, the system determines whether an appropriately named directory exists.

The system determines whether a directory exists as reflected by the appropriate year, 276. If a directory reflecting the appropriate year does not exist, the system creates such a directory, 278. If a directory reflecting the appropriate year does exist, the system then checks whether a directory reflecting the appropriate month exists within that year directory, 280. If the appropriate month directory does not exist within the year directory, the system creates a month directory within the year directory, 282. If the appropriate year and month directories exist, the system finally checks whether the appropriate day directory exists within the nested year/month directory, 284.

If the day directory does not exist, the system creates the appropriate day directory within the year/month directory, 286. If a directory reflecting the appropriate year, month and day already exists, the system creates a new document directory name into which the document will be stored. In one embodiment, the system generates a four-digit random number that gets appended to the end of the existing document directory name, 288. Once a unique document directory name is established, 286 and 288, the document is moved to that directory, 290 and the master document list is updated to reflect the document's new location, 292.

Overview of a Portal Appliance

Figure 3:
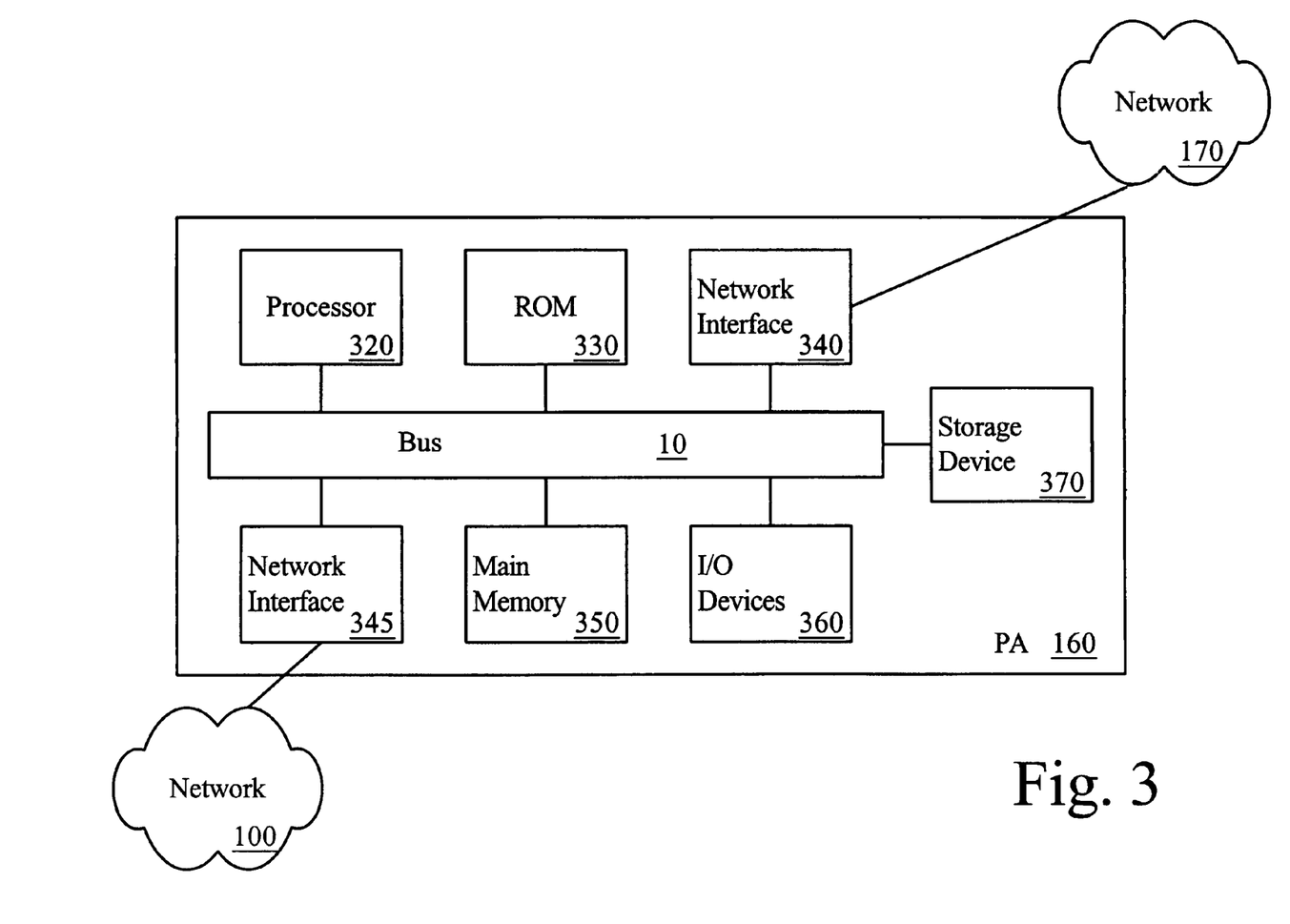
FIG. 3 illustrates one embodiment of a block diagram of a portal appliance.

FIG. 3 illustrates one embodiment of a block diagram of a portal appliance. PA 160 includes bus 310 or other communication device to communicate information, and processor 320 coupled to bus 310 to process information. While PA 160 is illustrated with a single processor, PA 160 can include multiple processors and/or co-processors. PA 160 further includes random access memory (RAM) or other dynamic storage device 350 (referred to as main memory), coupled to bus 310 to store information and instructions to be executed by processor 320. Main memory 350 also can be used to store temporary variables or other intermediate information during execution of instructions by processor 320.

PA 160 also includes read only memory (ROM) and/or other static storage device 330 coupled to bus 310 to store static information and instructions for processor 320. Storage device 370 is coupled to bus 310 to store information and instructions. Storage device 370 such as a magnetic disk or optical disc and corresponding drive can be coupled to PA 160.

PA 160 can also be coupled via bus 310 to I/O devices 360, such as a cathode ray tube (CRT) or liquid crystal display (LCD), to display information to a user, and alphanumeric input device to communicate information and command selections to processor 320. Another type of I/O device is a cursor control, such as a mouse, a trackball, or cursor direction keys to communicate direction information and command selections to processor 320 and to control cursor movement on the display. Additional and/or different I/O devices can also be coupled to bus 310.

Network interface 340 provides an interface between PA 160 and network 170. Similarly, network interface 345 provides an interface between PA 160 and network 100. In one embodiment, network interface 340 and network interface 345 are network interface cards (NICs), which are known in the art; however, any interface that can provide PA 160 with access to multiple networks can be used.

One embodiment of the invention is related to the use of PA 160 to perform searches on both network 100 and network 170. According to one embodiment, the searches are performed by PA 160 in response to processor 320 executing sequences of instructions contained in main memory 350. Instructions are provided to main memory 350 from a storage device, such as magnetic disk, a read-only memory (ROM) integrated circuit (IC), CD-ROM, DVD, via a remote connection (e.g., over a network), etc. In alternative embodiments, hard-wired circuitry can be used in place of or in combination with software instructions to implement the present invention. Thus, the present invention is not limited to any specific combination of hardware circuitry and software instructions.

Document Searching

Figure 4:
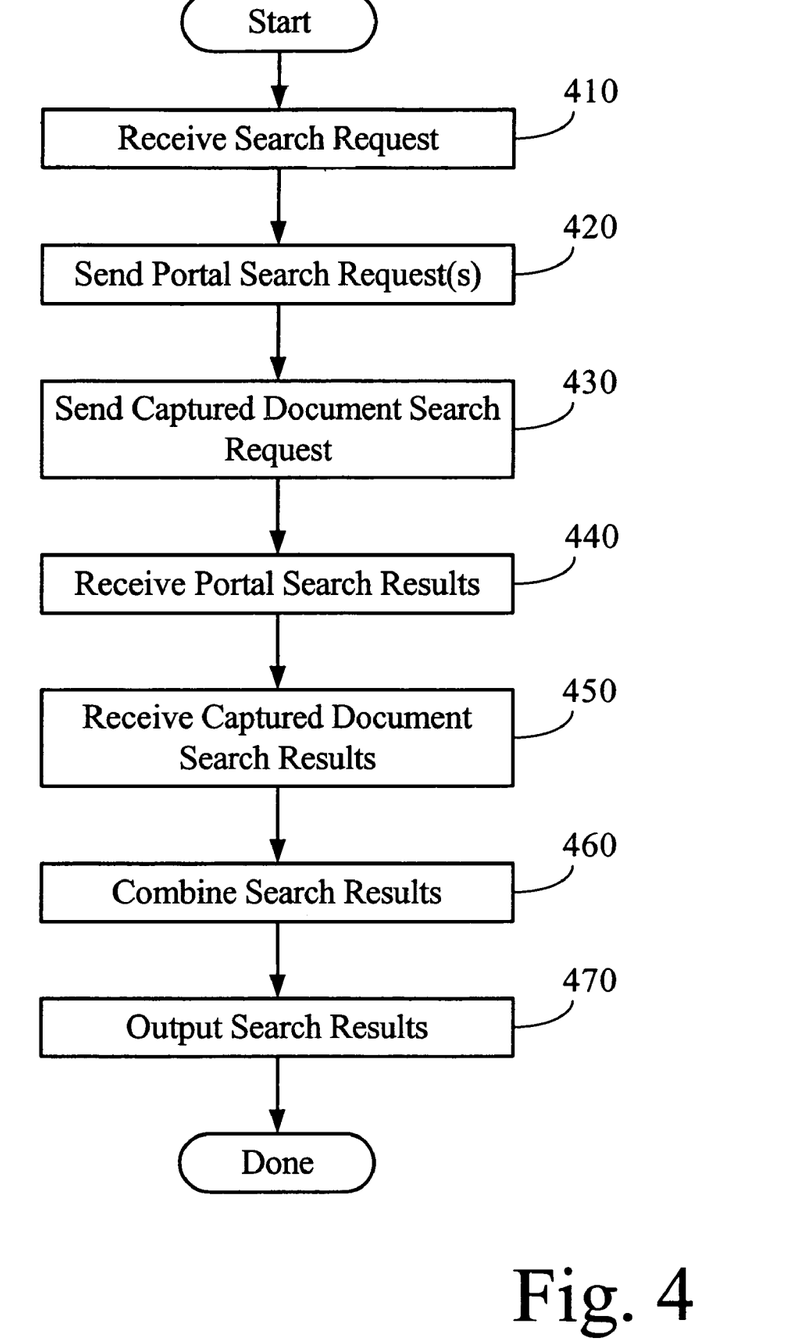
FIG. 4 is a flow diagram of one embodiment of a process for searching public documents and private documents in response to a single request.

FIG. 4 is a flow diagram of one embodiment of a process for searching public documents and private documents in response to a single request. The portal appliance receives a search request, 410. The search request can be in the form of a boolean text search, a plain language text search, or any other appropriate format.

The portal appliance sends the search request to one or more portals, 420. In one embodiment, the portal appliance performs any necessary request reformatting such that the portal search requests are recognized by the portal receiving the search request. Similarly, the portal appliance sends the search request to a networked FMA or other device to perform searches on unconsciously captured documents, 430. The portal search(es) and the captured document search can be performed in parallel or sequentially.

Results from the portal search are received, 440. Similarly, results from the captured document search are received, 450. The search results can be received in parallel or sequentially. The portal appliance combines the search results 460.

In one embodiment, the portal search report indicates where the captured document search report is to be inserted. This embodiment provides the portal with control of the style and content of the search report. If the search results are provided in Hypertext Markup Language (HTML) format, for example, an anchor (<A>) tag can be used to indicate where the captured document search report is to be inserted. For example <A HREF="search:foo" MODE="Table" WIDTH=300> indicates that the tag should be replaced with a captured document search for the word "foo" presented in a table with a width of 300 pixels. Of course, any other format can also be used.

In an alternative embodiment, the portal appliance controls the style and content of the search report by issuing search reports to one or more portals and to the FMA to search the captured documents. In one embodiment, the portal appliance generates Hypertext Transfer Protocol (HTTP) requests to the portals, which can be, for example, Common Gateway Interface (CGI) programs that perform the requested searches. The portal appliance receives the multiple search requests and combines the search requests into an appropriate format.

The portal appliance outputs the search results in response the combination of the search results, 470. In one embodiment, the search results are presented as an HTML document having links to the documents identified by the searches. Other formats, for example, Extensible Markup Language (XML) can also be used. If a user selects one of the links the document is retrieved from either a private source coupled to a network belonging to the organization or from an external public source.

Thus, a portal appliance or other device can integrate content from a portal with content from unconsciously captured documents to provide a searching party with a unified search result. The unified search result provided by the portal appliance allows a searching party to search both public documents published by other parties and internal documents accessible by the searching party in response to a single search without requiring a the publisher of the private documents to publicly release the content of the private documents.

In one embodiment, the search report output by the portal appliance includes advertising that is based on the search performed. The search terms can be used to determine the advertising to be displayed to the searching party. Advertising can also be provided by the portal appliance based on the search terms or other information, for example, an internal user profile. By providing information for selection of advertising and displaying the advertising the organization controlling the portal appliance can receive advertising revenue.

Figure 5:
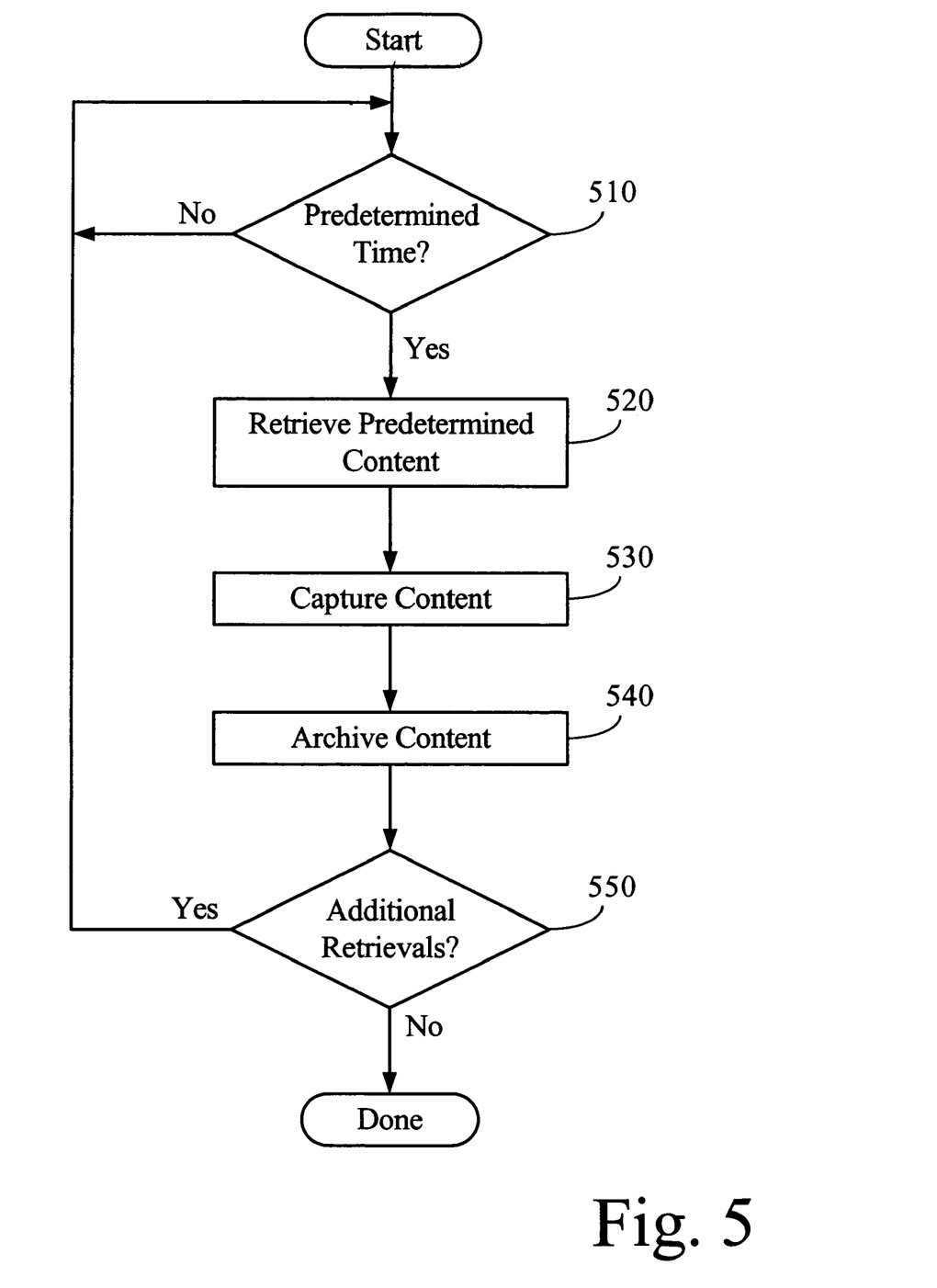
FIG. 5 is one embodiment of a flow diagram of a processor for capturing public content at predetermined times for unconscious capture.

FIG. 5 is one embodiment of a flow diagram of a process for capturing public content at predetermined times for unconscious capture. In one embodiment, the portal appliance can retrieve information at predetermined times. The retrieved information can be used, for example, to populate a database with information provided but not archived by a portal (e.g., stock quotes, press releases, news). The portal appliance retrieves the information and the FMA causes the information to be captured and archived. The archived information can the be accessed and/or searched at a later time.

The portal appliance waits for a predetermined time for retrieving information, 510. Predetermined content is retrieved in response to a request at the predetermined time, 520. The content can be retrieved by the portal appliance "pulling" the content, for example, in the form of one or more HTTP requests initiated by the portal appliance. The content can also be "pushed" by an external portal to the portal appliance, for example, with an HTTP or FTP operation. The content is captured by the portal appliance, 530. The content is archived by, for example, the FMA, 540. If additional retrievals are scheduled, 550, the process is repeated.

In the foregoing specification, the invention has been described with reference to specific embodiments thereof. It will, however, be evident that various modifications and changes can be made thereto without departing from the broader spirit and scope of the invention. The specification and drawings are, accordingly, to be regarded in an illustrative rather than a restrictive sense.

What is claimed is:

1. A method comprising:

generating, automatically with an electronic device without user intervention, a private local network search request in response to an original search request, the private local network search request to cause a search to be performed on electronic documents stored by a device that is part of a private locate network, the private local network search request making the documents searchable by electronic devices belonging to an organization corresponding to the electronic device and not searchable by remote electronic devices not corresponding to the organization, and wherein one or more of the documents are archived on the device of the private local network in the absence of an explicit command by a user to save the electronic documents, but archived and indexed in response to another user specified function associated with the electronic documents to transmit the electronic documents over the private local network or process the electronic documents by one or more devices connected to the private local network, the search of the electronic documents on the private local network to be performed according to search parameters of the original search request and without making available the electronic documents to search requests of remote electronic devices outside the private local network;

generating, automatically with the electronic device without having to wait for a search result of the private local network search request from the private local network and in addition to the private local network search request, an external network search request in response to the original search request, the external network search request to cause a search to be performed on electronic documents available from devices that are part of an external public network via a network portal of an external network according to the search parameters of the original search request; and generating a single search report at the electronic device based on the search results of the private local network search request and the public external network search request.

2. The method of claim 1 wherein the electronic device comprises a file management appliance.

3. The method of claim 2 wherein the file management appliance generates the private local network search request and the external network search request.

4. The method of claim 2 wherein the file management appliance performs a search of at least one unconsciously captured electronic documents in response to the private local network search request.

5. The method of claim 2 wherein an Internet portal performs a search of the electronic documents available via a network portal of an external network in response to the external network search request.

6. The method of claim 1 wherein the private local network search request and the external network search request are generated by a portal appliance in response to the original search request.

7. The method of claim 1 wherein the single search report is generated by combining at least portions of content from the search results of the private local network search request and the external network search request without revealing the associated unconsciously captured electronic documents of the private local network to the external network.

8. The method of claim 7 wherein the search report is one of a Hypertext Markup Language (HTML) document and an Extensible Markup Language (XML) document.

9. The method of claim 7 wherein the single search report is generated by integrating the external and private local network search results, wherein the external network search result specifies where and how the private local network search result is to be integrated into the external network search result in order to form the single search report.

10. The method of claim 7 wherein the search report comprises an advertisement selected based on the external network search request.

11. The method of claim 7 wherein the search report comprises an advertisement selected based on analysis of documents indicated by search results.

12. The method of claim 1 further comprising:
generating a third search request in response to the original search request, the third search request to cause a search to be performed on electronic documents available via a second network portal of the external network according to the search parameters of the original search request;
analyzing search results of the private local network search request, the external network search request, and the third search request; and
generating the single search report in response to the analysis of the search results, wherein the single search report is generated in accordance with a format specified by the electronic device.

13. A machine readable medium having stored thereon sequences of instructions that, when executed by one or more processors, cause one or more electronic devices to:
generate, automatically with an electronic device without user intervention, a private local network search request in response to an original search request, the private local network search request to cause a search to be performed on electronic documents stored by a device that is part of a private local network, the private local network search request making the documents searchable by electronic devices belonging to an organization corresponding to the electronic device and not searchable by remote electronic devices not corresponding to the organization, and wherein one or more of the documents are archived on the device of the private local network in the absence of an explicit command by a user to save the electronic documents, but archived and indexed in response to another user specified function associated with the electronic documents to transmit the electronic documents over the private local network or process the electronic documents by one or more devices connected to the private local network, the search of the electronic documents on the private local network to be performed according to search parameters of the original search request and without making available the electronic documents to search requests of remote electronic devices outside the private local network;
generate, automatically with the electronic device without having to wait for a search result of the private local network search request from the private local network and in addition to the private local network search request, an external network search request in response to the original search request, the external network search request to cause a search to be performed on electronic documents available from devices that are part of an external public network via a network portal of an external network according to the search parameters of the original search request; and
generate a single search report at the electronic device based on the search results of the private local network search request and the public external network search request.

14. The machine readable medium of claim 13 wherein the electronic device comprises a file management appliance.

15. The machine readable medium of claim 14 wherein the file management appliance generates the private local network search request and the external network search request.

16. The machine readable medium of claim 14 wherein the file management appliance performs a search of at least one unconsciously captured electronic documents in response to the private local network search request.

17. The machine readable medium of claim 14 wherein an Internet portal performs a search of the electronic documents available via a network portal of an external network in response to the external network search request.

18. The machine readable medium of claim 13 wherein the private local network search request and the external network search request are generated by a portal appliance in response to the original search request.

19. The machine readable medium of claim 13 wherein the single search report is generated by combining at least portions of content from the search results of the private local network search request and the external network search request without revealing the associated unconsciously captured electronic documents of the private local network to the external network.

20. The machine readable medium of claim 19 wherein the search report is one of a Hypertext Markup Language (HTML) document and an Extensible Markup Language (XML) document.

21. The machine readable medium of claim 19 wherein the single search report is generated by integrating the external and private local network search results, wherein the external network search result specifies where and how the private local network search result is to be integrated into the external network search result in order to form the single search report.

22. The machine readable medium of claim 19 wherein the search report comprises an advertisement selected based on the external network search request.

23. The machine readable medium of claim 19 wherein the search report comprises an advertisement selected based on analysis of documents indicated by search results.

24. The machine readable medium of claim 13 further comprising:
generating a third search request in response to the original search request, the third search request to cause a search to be performed on electronic documents available via a second network portal of an external network according to the search parameters of the original search request;
analyzing search results of the private local network search request, the external network search request, and the third search request; and
generating the single search report in response to the analysis of the search results, wherein the single search report is generated in accordance with a format specified by the electronic device.

25. An apparatus comprising:
a first device to automatically capture and index electronic documents from a private local network, the private local network making the documents searchable by electronic devices belonging to an organization corresponding to the electronic device and not searchable by remote electronic devices not corresponding to the organization; and an application to be executed by the first device to search the captured electronic documents that have been archived and indexed to the first device in the absence of an explicit command by a user to save the electronic documents, but archived and indexed in response to another user specified function associated with the electronic documents to transmit the electronic documents over the private local network or process the electronic documents by one or more devices connected to the private local network, in response to a search request, wherein the application also generates an external document search request in response to the search request without having to wait for a search result of the local network and without making available the electronic documents to search requests of remote electronic devices outside the local network, wherein the first device transmits the external document search request to a second device on an external public network, wherein the second device on the external public network performs the external document search request to generate a search of electronic documents from an external network, and wherein the first device combines the private local network search result and the external public network search result to generate a single search report.

26. The apparatus of claim 25 wherein the external document search is performed by an Internet portal.

27. The apparatus of claim 25 wherein the search of captured electronic documents is performed by the first device.

28. The apparatus of claim 25, wherein the single search report is generated by combining at least portions of content from the search results of the local network search request and the external network search request without revealing the associated captured electronic documents of the private local network to the external network.

29. The apparatus of claim 25, wherein the single search report is generated by integrating the external and private local network search results, wherein the external network search result specifies where and how the private local network search result to be integrated into the external network search result in order to form the single search report.

30. The apparatus of claim 25, wherein the first device further generates a second external network search request to the external network which is performed by a third device on the external network and analyzes the search results of the captured electronic documents, the external document search request, and the second external network search request, wherein the single search report is generated in response to the analysis of the search results and the single search report is generated in accordance with a format specified by the first device.

* * * * *